(12) United States Patent
Söderholm et al.

(10) Patent No.: US 6,651,516 B2
(45) Date of Patent: Nov. 25, 2003

(54) INCLINED PLATE APPARATUS FOR MEASURING MASS FLOW

(75) Inventors: Arne Söderholm, Bromma (SE); Olle Söderholm, Bromma (SE)

(73) Assignee: S.E.G. Mekanik AB, Amal (SE)

( * ) Notice: Subject to any disclaimer, the term of this patent is extended or adjusted under 35 U.S.C. 154(b) by 0 days.

(21) Appl. No.: 09/793,702

(22) Filed: Feb. 27, 2001

(65) Prior Publication Data

US 2001/0029789 A1 Oct. 18, 2001

(30) Foreign Application Priority Data

Feb. 29, 2000 (EP) .............................. 00850036

(51) Int. Cl.$^7$ ................................................ G01F 1/30
(52) U.S. Cl. ................................................ 73/861.73
(58) Field of Search .................. 73/861.73, 761.71, 73/861.72, 861.74, 862.041, 862.042, 862.043, 862.044

(56) References Cited

U.S. PATENT DOCUMENTS 5,495,773 A * 3/1996 Olesen .................... 73/861.73
5,834,707 A * 11/1998 Wirth ...................... 177/116

FOREIGN PATENT DOCUMENTS

| DD | 29 15 710 | 11/1979 |
| EP | 0 431 525 A2 | 10/1984 |
| WO | WO 93/16356 | 8/1993 |
| WO | WO 93/22633 | 11/1993 |

* cited by examiner

Primary Examiner—Edward Lefkowitz
Assistant Examiner—Corey D. Mack
(74) Attorney, Agent, or Firm—Pillsbury Winthrop LLP

(57) ABSTRACT

An apparatus for weighing the mass flow of fluent material, especially of particulate type. The apparatus includes a rectilinear and inclined measuring plate on which the material is sliding. The measuring plate is fastened at a central portion of the plate. The fastening device includes one moment measuring unit configured to measure the moment around a horizontal axis crossing the vertical axis. The moment measuring unit is attached to a force measuring unit configured to measure the force directed in or parallel to the vertical axis. The force measuring unit is coupled for support to physical ground, and the material flow is determined by a calculating unit from the output signals from the moment measuring unit and the force measuring unit by determining the forces exerted on the measuring plate and substantially in the direction of the flow.

9 Claims, 3 Drawing Sheets

INCLINED PLATE APPARATUS FOR MEASURING MASS FLOW

DESCRIPTION

This invention relates to apparatus for weighing a continuous stream of fluent material.

There is a method of weighing a continuous stream of fluent material which includes means to direct the material onto a weighing means which, in the direction of flow of the material, is arranged in a plane at an acute angle relative to a vertical plane and measuring, in a plane substantially parallel to the plane in which the weighing means is arranged, the load applied by the material to the weighing means and generating a signal representative of the mass of the material. To determine the mass flow, the velocity of the flow must be determined by a signal representative of the velocity. These two signals are then processed in an electronic device where also the total material weighed is calculated.

BACKGROUND ART

Most of the number of weighing apparatuses of this and similar types of practical reasons leave out the speed signal and the mass flow is to be determined by calibration with a known material flow. An example of equipment for producing a speed signal is disclosed in the U.S. Pat. No. 5,002,140, where a wheel with ribbed surface is placed where the material is leaving the weighing plate and can impinge to cause the wheel to rotate proportional to the speed of the material. Of reliability reasons the method is limited to suitable materials and the speed signal is not representing the mean value of the material sliding over the plate. It is also known from the European patent EP 0626062 (U.S. Pat. No. 5,495,773) to calculate the mean velocity from the changing of the flow profile when a particulate material is accelerating along the weighing plate. This is done by supporting the plate at two different levels along the tilted plate by force measuring means. A third force measuring means is also present to determine the friction force of the material against plate surface. The magnitude of the forces exerted relative the capacity of the bulk flow is relatively small, where the number of supporting and pivot points in combination with the small order of forces attacking the measuring means make the suggested constructions delicate. Especially where small differences between two measured forces are to be measured.

SUMMARY OF THE INVENTION

It is the object of the present invention to provide an apparatus of the kind referred to, which gives a simple and sturdy mechanical construction together with measuring of both the weight of the material and its velocity.

A continuous flow of fluid or particulate material sliding on a tilted plane increases its velocity by the gravitation force. The section of the stream thus decreases as the velocity increases. From this behavior the weight of the mass of the upper part will be larger than of the lower part. Around a horizontal axis straight across the centre part of the tilted plate a moment arises which is proportional to the difference of the masses on each side. It can be shown that the difference of the masses is proportional to the velocity of the material. By directly measuring that moment with a moment transducer one factor for determining the velocity of the mass flow will be given. The other factor is the sum of the weight of the material on the tilted plate. That is done with a load transducer, which just is measuring the load in the direction of or parallel to one specified axis, and placed below the moment transducer, it measures the total load on the plate regardless of its distribution over the surface of the tilted plate. The plate is attached in one central point on the underside of the plate or along a horizontal axis and the load transducer is attached to the ground carrying the plate via the moment transducer. It can be shown that the moment signal in combination with the weight signal will give a measurement of the flow. The background for the calculations is that the relative change in the height of the material sections in the upper and lower ends of the plate in comparison to the mean value of the height is proportional to the change of the velocity of the material flow in comparison with the mean velocity over the plate. Included in the invention is the calculating means for indicating the flow.

DESCRIPTION OF THE PREFERRED EMBODIMENT

Figure 1:
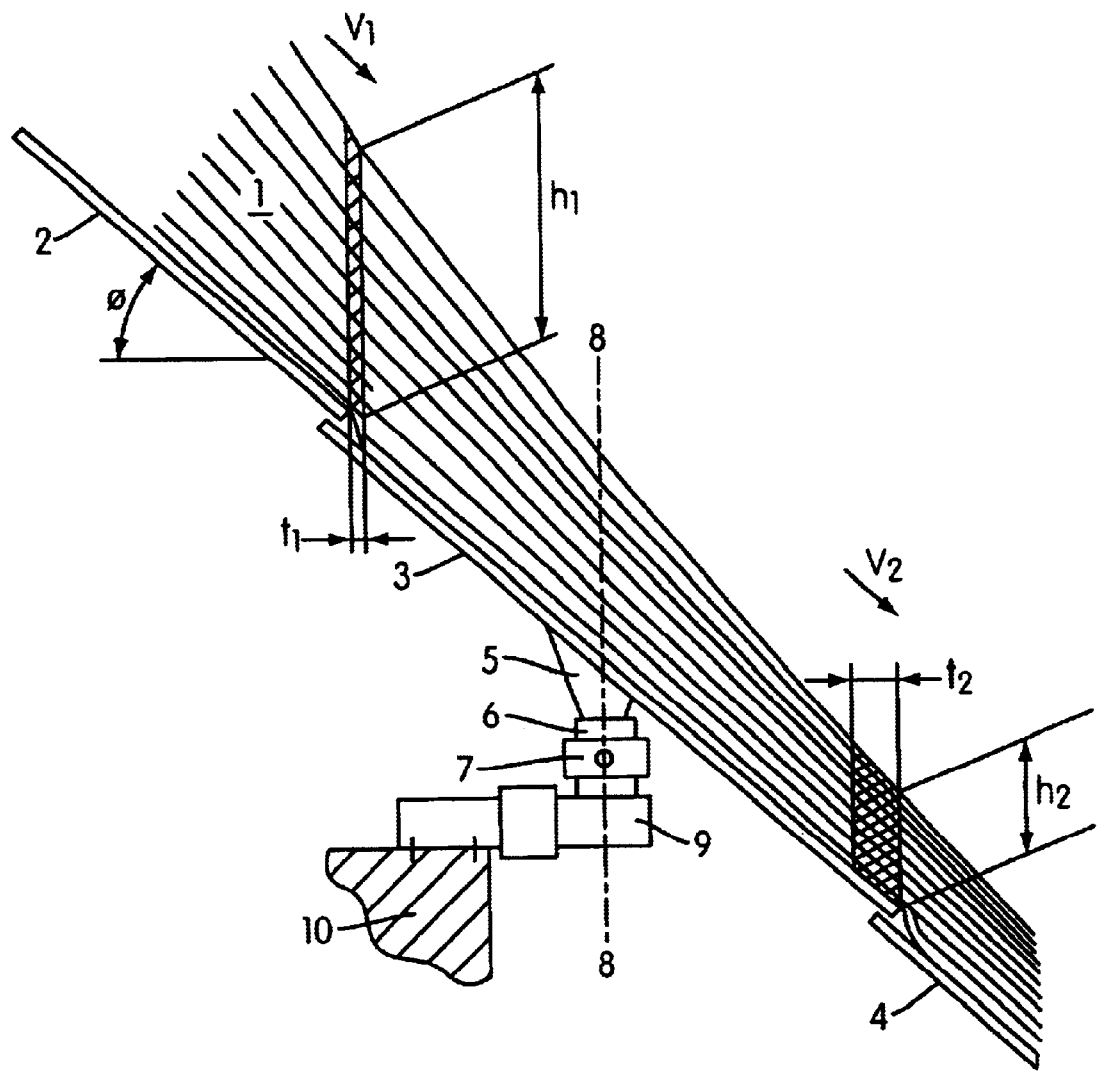
FIG. 1 is a schematic side elevation view of a flow meter embodying principles of the present invention.

FIG. 1 shows the basic design of the invention. The material 1 is sliding along the inlet plate 2 from above with an angle $\phi$ and continues over the measuring plate 3 and outlet plate 4. The measuring plate is carried by an attachment means 5, which is attached to a moment transducer 6, which is measuring the moment round the horizontal axis, point 7, situated along the centre line 8—8. Further, the moment transducer 6 is attached to one end of a force transducer 9, which is made only to measure forces in the direction of or parallel to the centre line 8—8. The other end of the transducer 9 is attached to the ground 10.

The inlet velocity of the material to the plate 3 is $v_1$ and the outlet velocity is $v_2$. The height $h_1$ is the height of the sectional area of the incoming material and $h_2$ the height of the outlet area. To illustrate how a continues flow behave when sliding with constant gravitation along the tilted plate, the mass volume with the length $l_1$ is shown at the inlet point and that will correspond to the volume $V=h_1 \cdot l_1 \cdot b$, where b is the width of the measuring plate. At the outlet point the same volume changes its dimensions to $V=h_2 \cdot l_2 \cdot b$ which area is marked as two equal cross-sectioned areas in the figure. At the distance from the inlet to the outlet of the plate the velocity has changed from $v_1$ to $v_2$. It can be shown that the relative change of the velocity $(v_1-v_2)/(v_1+v_2)$ is inversely proportional to the relative change of the height of the material on the weighing plate $(h_1-h_2)/(h_1+h_2)$. The velocity can be deduced by determining the heights of the material. The moment (M) round the axis 7 is equal to the difference of weights of the material on each side of the centre line 8—8. On FIG. 1 it is seen as the difference of material areas because of the heights $h_1$ and $h_2$, which difference $h_1-h_2$ is proportional to the moment measured by the transducer 6. The sum $h_1+h_2$ is given from the measurement of the force transducer 9. As it is independent of the centre of gravity of the load, the measurement is the weight (G) which corresponds to the mean value $(h_1+h_2)/2$. It can be shown that the material flow (q) is equal to $$q=G\sqrt{C*G/M}$$

where C is a constant and G/M represents the velocity.

Figure 2:
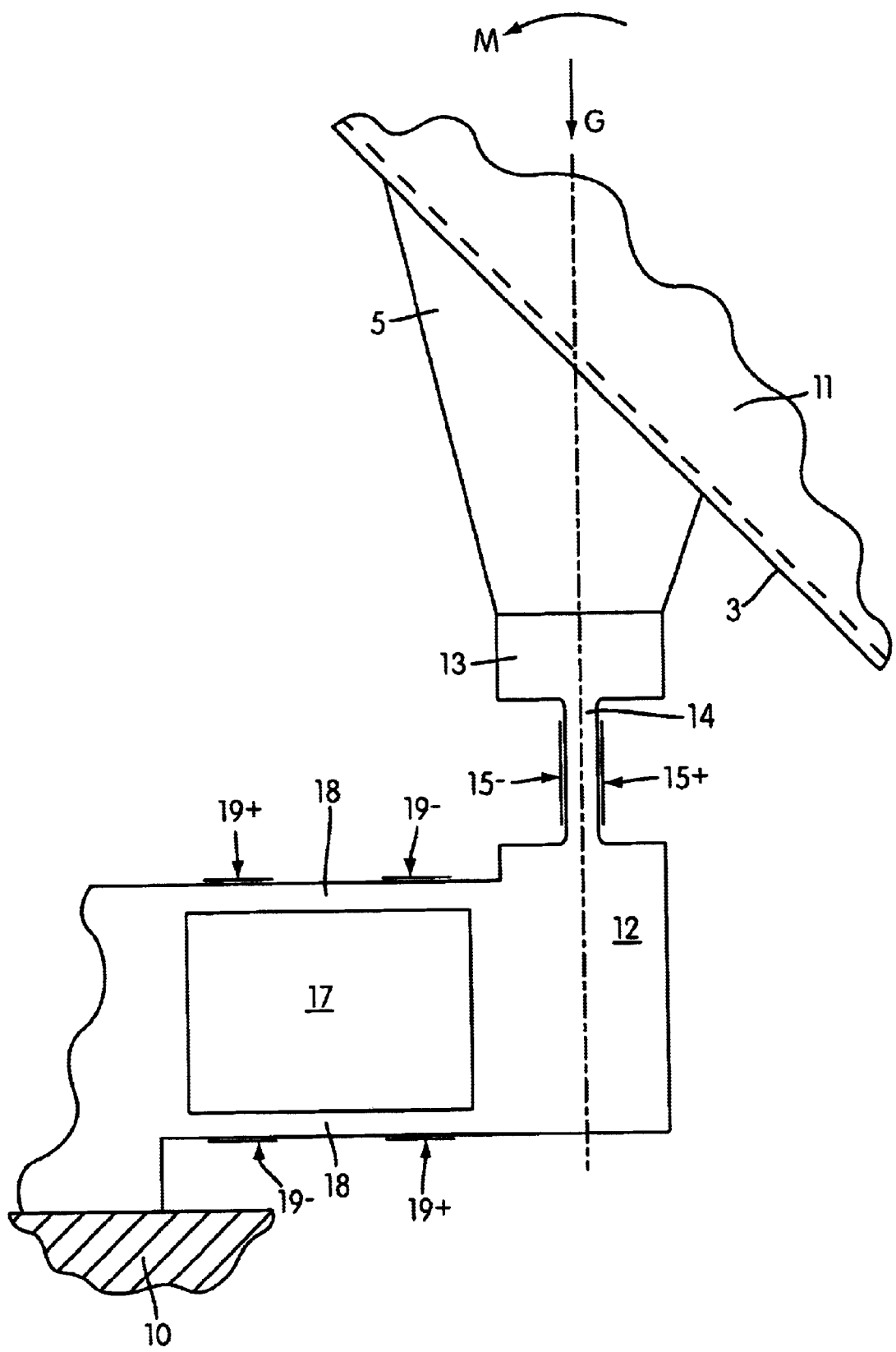
FIG. 2 is a larger scale fragmentary side elevational view of the centre specific embodiment thereof.

FIG. 2 shows a simplified embodiment of a construction of the transducers. The central part of the inclined plate 3 with side frame 11 is shown. To the attachment means 5 a combined moment- and force transducer 12 is placed, which is attached to the ground 10. The upper part of the combined transducer is the moment measuring transducer 13. This consists of a pair of recesses and the remaining central part is forming a cantilever 14. On the vertical sides a pair of strain gauges 15+ and 15– are placed. A counter clock wise moment M will cause an increasing strain in 15+ and a compression in 15–, which in known way in a bridge connection will produce a signal proportional to the moment M. The vertical load G will produce the same compression in both gauges and the bridge signal is nil. The lower, horizontal part 16 of the transducer is made with a rectangular hole 17 leaving two flat bars 18. The bars are provided with two pairs of strain gauges 19+ and 19–, which for the vertical load G will cause an increasing strain in the gauges 19+ and a compression in the gauges 19–, whereby a bridge connection for all four gauges will produce a signal proportional to the load G. The moment M will produce a horizontal force in the bars 18 which will even out the bridge signal to nil. The signals then are processed according to the equation above to get the flow q.

The load sensing unit 6,9 may also be mounted perpendicular to the measuring plate 3, and as the load transducer is measuring loads only along and parallel with its centre line, the output signal will be reduced with cos φ, where φ is the tilting angle shown in FIG. 1.

Figure 3:
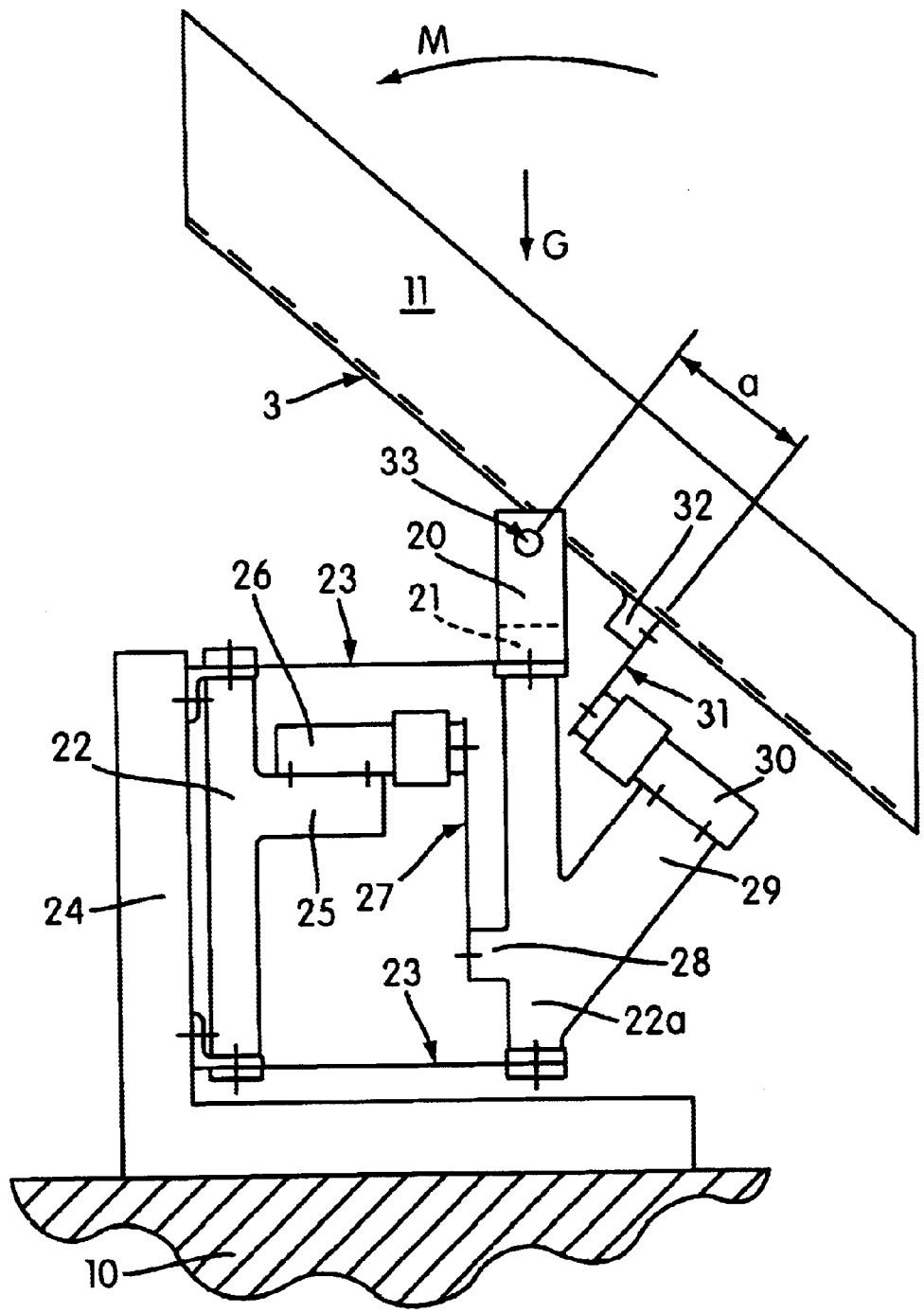
FIG. 3 is a schematic side elevation view of the complete flow meter and frame for smaller magnitudes of flows embodying principles of the present invention.

FIG. 3 shows a side elevation view of a flow meter embodying principles of the present invention and adopted to smaller capacities than for which the design of the transducers on FIG. 2 are suitable. The moment measuring means consists of a combination of a lever with constant length and a conventional strain gauge load beam. The measuring plate 3 is provided with side frames 11. Under the centre of plate 3 is a shaft 33 attached in the cross direction of plate 3 and the shaft is formed to journals on each side of the plate. These journals are pivoted in holes in the brackets 20, which are attached to a bar 21 (not seen in the figure). At its centre the bar 21 is attached to a vertical load measuring unit below. This unit consists of a parallel frame with two pillars 22, 22a on whose flat ends a pair of springy strips 23 are firmly attached. The pillar 22 is attached to a L-formed frame 24, which is resting on the ground 10. On pillar 22 a console 25 is mounted, which is carrying the attached load beam 26. This consists of conventional strain gauge beam type, and senses loads in the cross direction to its length axis and is via a strip 27 carrying the load on pillar 22a, whereby the strip 27 in its other end is fastened to the head 28. On the pillar 22a also is a console 29 on which the load beam 30 is attached. This is of the same type as the beam 26. To its free end a strip 31 is fastened, which one also is attached to the head 32 on plate 3 at a direction perpendicular to the under side of the plate 3. The distance a from the centre of the shaft 33 to the strip 31 is the lever for the moment measurement with load beam 30. The distance from the centre of the shaft 33 to the gravity centres for different loads on each side of the shaft 33, when material slides along the plate 3, will in this application be longer then the lever to the load beam. Hereby the output signal from the load beam 30 is changed.

The relation concerning the positions of the measuring means, with upper position of the moment measuring mean to the force measuring mean below, is in this case the same as in previous examples. In principle it is also possible to exchange the positions of the moment- and load measuring units even if the moment measuring unit, being the smallest quantity, easier will be overloaded. The pivot part formed by the hole in the bracket 20 introduces friction errors at the moment measuring, which can be avoided by replacing them to flexible spring elements in form of a flat, short strip in vertical position on each side of plate 3 at the same position as the pivoting journals. Alternatively the pivot is given the form of cross spring elements consisting of two short strips placed into each other perpendicular positions.

The calculating means required to determine the flow value is preferably consisting of a computer, where also additional programmed functions to secure maximum measuring accuracy is included, such as keeping the velocity signal locked during transient loads, and automatic zero setting when the flow is absent. A requisite for the latter is that no noise from individual particles is present, which is secured by analysing the flow pattern.

From the background art to this invention it is learned that the frictional force between the sliding material and the surface of the tilted plate, which introduces measuring errors, can be compensated for by a separate force measuring means. That error can also be corrected for by the apparatus according to the present invention. A third load measuring means, applied above the moment measuring means (FIG. 2, part 13) but under the tilting plate 3, is arranged so that the force along the direction only of the tilting plate is measured. This can be arranged by fastening a force transducer 16 between the attachment means 5 and the plate 3.

What is claimed is:

1. Apparatus for measuring the mass flow of fluent material along a path in the direction of the flow comprising:
   a substantially rectilinear and inclined measuring plate, the measuring plate having a fastening portion substantially disposed at a central level thereof;
   a fastening device coupled to the fastening portion and configured to support the measuring plate at the central level along a vertical axis;
   at least one moment measuring unit disposed beneath the fastening device and configured to measure a moment of the measuring plate around a horizontal axis passing through the central level;
   at least one force measuring unit coupled to physical ground and configured to measure a force of a load on the measuring plate parallel to the vertical axis; and
   a calculating unit configured to receive signals from the moment measuring unit and the force measuring unit and to calculate the flow of the material on the measuring plate.

2. An apparatus according to claim 1, wherein the calculating unit includes adapting circuits for the moment and force measuring units; and a microprocessor for handling calculation of the flow of material on the measuring plate.

3. An apparatus according to claim 2,
   wherein the calculating unit performs a function of ascertaining a signal value from the moment measuring unit at a time defined by a disturbance in the material flow.

4. An apparatus according to claim 2,
   wherein the calculating unit is provided with automatic zero setting functions acting when the flow is absent.

5. An apparatus according to claim 4, wherein the calculating unit is provided with automatic zero setting functions acting when the flow is absent by continuously sensing the flow by analyzing a flow-dependent signal pattern from the moment and force measuring units; and then maintaining the moment and force measuring units signals at zero.

6. An apparatus according to claim 1, wherein the moment measuring unit includes a force transducer and a lever; an end of the lever is disposed at a center of a shaft supported by a pair of journals attached to the long sides of the measuring plate the other end of said lever is connected to a force measuring transducer, and each of the journals providing a pivoting round bracket on each side of measuring plate and the brackets are attached to a vertical force measuring transducer disposed along the vertical axis; and the direction of the lever is arranged so that a force in opposition to the measured moment corresponds to the force measuring direction of said force measuring transducer.

7. An apparatus according to claim 1 or 2, wherein, disposed between the under side of the measuring plate and the moment measuring unit, is a force measuring transducer configured to measure a force only in an opposite direction to the direction of the sliding material; and the calculating unit is configured to include functions to calculate the interference from a signal from the force measuring transducer on the value of the material flow.

8. An apparatus according to claim 1, further comprising a unitary member, wherein the at least one moment measuring unit and the at least one force measuring unit are coupled to the unitary member.

9. An apparatus according to claim 1 or 8, wherein the at least one force measuring unit is connected tot he fastening portion at the central level of the measuring plate; and the at least one moment measuring unit is disposed beneath the at least one force measuring unit is coupled to physical ground.

* * * * *